(12) United States Patent
Jiang

(10) Patent No.: US 10,956,788 B2
(45) Date of Patent: Mar. 23, 2021

(54) ARTIFICIAL NEURAL NETWORK

(71) Applicant: Nokia Technologies Oy, Espoo (FI)

(72) Inventor: Xiaoheng Jiang, Tianjin (CN)

(73) Assignee: Nokia Technologies Oy, Espoo (FI)

(*) Notice: Subject to any disclaimer, the term of this patent is extended or adjusted under 35 U.S.C. 154(b) by 89 days.

(21) Appl. No.: 16/321,285

(22) PCT Filed: Aug. 8, 2016

(86) PCT No.: PCT/CN2016/093904
§ 371 (c)(1),
(2) Date: Jan. 28, 2019

(87) PCT Pub. No.: WO2018/027453
PCT Pub. Date: Feb. 15, 2018

(65) Prior Publication Data
US 2019/0180148 A1  Jun. 13, 2019

(51) Int. Cl.
*G06K 9/62* (2006.01)
*G06N 3/04* (2006.01)
(Continued)

(52) U.S. Cl.
CPC ......... *G06K 9/6262* (2013.01); *G06K 9/4628* (2013.01); *G06K 9/6273* (2013.01);
(Continued)

(58) Field of Classification Search
CPC ........ G06N 3/0472; G06N 3/08; G06N 3/082; G06N 3/0481; G06N 3/0454; G06N 3/02; G06K 9/6273; G06K 9/6262; G06K 9/4628; G06T 3/4046; G06T 9/002; G06T 2207/20084; H03H 2017/0208; H03H 2222/04
(Continued)

(56) References Cited

U.S. PATENT DOCUMENTS

2013/0343641 A1  12/2013  Mnih et al.
2016/0019458 A1*  1/2016  Kaufhold ............. G06N 3/0454
                                              342/25 F
(Continued)

FOREIGN PATENT DOCUMENTS

CN  105678333 A  6/2016

OTHER PUBLICATIONS

Srivastava et al., "Dropout: A Simple Way to Prevent Neural Networks from Overfitting", Journal of Machine Learning Research, vol. 15, No. 1, 2014, pp. 1929-1958.
(Continued)

*Primary Examiner* — Huy C Ho
(74) *Attorney, Agent, or Firm* — Ditthavong, Steiner & Mlotkowski

(57) ABSTRACT

According to an example aspect of the present invention, there is provided an apparatus comprising memory configured to store data defining, at least partly, an artificial neural network, and at least one processing core configured to train the artificial neural network by applying a test dataset to the artificial neural network with at least one stochastic rectified linear unit, the at least one stochastic rectified linear unit being configured to produce a positive output from a positive input by multiplying the input with a stochastically selected value.

20 Claims, 5 Drawing Sheets

(51) Int. Cl.
 G06K 9/46 (2006.01)
 G06N 3/08 (2006.01)
(52) U.S. Cl.
 CPC ......... *G06N 3/0454* (2013.01); *G06N 3/0472* (2013.01); *G06N 3/0481* (2013.01); *G06N 3/08* (2013.01); *G06N 3/082* (2013.01)
(58) Field of Classification Search
 USPC .......................................................... 382/157
 See application file for complete search history.

(56) References Cited

U.S. PATENT DOCUMENTS

2016/0070673 A1  3/2016 Wang et al.
2016/0092766 A1  3/2016 Sainath et al.
2018/0197049 A1* 7/2018 Tran .................. G06K 9/66

OTHER PUBLICATIONS

Zeiler et al., "Stochastic Pooling for Regularization of Deep Convolutional Neural Networks", Neural and Evolutionary Computing, Jan. 2013, pp. 1-9.
Jin et al., "Deep Learning with S-shaped Rectified Linear Activation Units", arXiv, Dec. 2015, 7 pages.
Tomasi et al., "Deep Convolutional Neural Nets", Wayback Machine, 2016, pp. 1-7.
Xu et al., "Empirical Evaluation of Rectified Activations in Convolutional Network", arXiv, Nov. 2015, 5 pages.
Li et al., "Improving Deep Neural Network with Multiple Parametric Exponential Linear Units", arXiv, Jun. 2016, pp. 1-16.
Shang et al., "Understanding and Improving Convolutional Neural Networks via Concatenated Rectified Linear Units", Proceedings of the 33rd International Conference on Machine Learning, vol. 48, Jul. 2016, 17 pages.
Nair et al., "Rectified Linear Units Improve Restricted Boltzmann Machines", Proceedings of the 27th International Conference on International Conference on Machine Learning, Jun. 21-24, 2010, 8 pages.
International Search Report and Written Opinion received for corresponding Patent Cooperation Treaty Application No. PCT/CN2016/093904, dated Apr. 20, 2017, 11 pages.
Extended European Search Report received for corresponding European Patent Application No. 16911909.6, dated Feb. 24, 2020, 6 pages.

* cited by examiner

US 10,956,788 B2

ARTIFICIAL NEURAL NETWORK

RELATED APPLICATION

This application was originally filed as PCT Application No. PCT/CN2016/093904 filed Aug. 8, 2016.

FIELD

The present invention relates to artificial neural networks, such as, for example, convolutional artificial neural networks.

BACKGROUND

Machine learning and machine recognition finds several applications, such as, for example, automated passport control at airports, where a digital image of a person's face may be compared to biometric information, stored in a passport, characterizing the person's face.

Another example of machine recognition is in handwriting or printed document text recognition, to render contents of books searchable, for example. A yet further example is pedestrian recognition, wherein, ultimately, a self-driving car is thereby seen as being enabled to become aware a pedestrian is ahead and the car can avoid running over the pedestrian.

In addition to visual recognition, spoken language may be the subject of machine recognition. When spoken language is recognized, it may be subsequently input to a parser to provide commands to a digital personal assistant, or it may be provided to a machine translation program to thereby obtain a text in another language, corresponding in meaning to the spoken language.

Machine recognition technologies employ algorithms engineered for this purpose. For example, artificial neural networks may be used to implement machine vision applications. Artificial neural network may be referred to herein simply as neural networks. Machine recognition algorithms may comprise processing functions, in recognition of images such processing functions may include, for example, filtering, such as morphological filtering, thresholding, edge detection, pattern recognition and object dimension measurement.

Neural network may be comprise, for example, fully connected layers and convolutional layers. A fully connected layer may comprise a layer wherein all neurons have connections to all neurons on an adjacent layer, such as, for example, a previous layer. A convolutional layer may comprise a layer wherein neurons receive input from a part of a previous layer, such part being referred to as a receptive field, for example.

SUMMARY OF THE INVENTION

The invention is defined by the features of the independent claims. Some specific embodiments are defined in the dependent claims.

According to a first aspect of the present invention, there is provided an apparatus comprising memory configured to store data defining, at least partly, an artificial neural network, and at least one processing core configured to train the artificial neural network by applying a test dataset to the artificial neural network with at least one stochastic rectified linear unit, the at least one stochastic rectified linear unit being configured to produce a positive output from a positive input by multiplying the input with a stochastically selected value.

Various embodiments of the first aspect may comprise at least one feature from the following bulleted list:
- the stochastical selection comprises a random or pseudo-random stochastic selection
- the dataset comprises a plurality of test images and the at least one processing core is configured to vary the stochastically selected value for each test image
- the at least one processing core is configured to apply a first stochastic rectified linear unit between a first pair of convolutional layers in the artificial neural network, and a second stochastic rectified linear unit between a second pair of convolutional layers in the artificial neural network
- the at least one stochastic rectified linear unit is configured to produce a zero output from a negative input
- the at least one processing core is configured to implement a stochastic dropout function in the artificial neural network, the dropout feature stochastically setting half of activations within a layer to zero for each training sample
- the stochastical selection comprises that the value is randomly or pseudorandomly selected from the range (1−a, 1+a)
- the value a is 0.8
- the value a is 0.3
- the artificial neural network is a pattern recognition neural network.

According to a second aspect of the present invention, there is provided method comprising storing data defining, at least partly, an artificial neural network, and training the artificial neural network by applying a test dataset to the artificial neural network with at least one stochastic rectified linear unit, the at least one stochastic rectified linear unit being configured to produce a positive output from a positive input by multiplying the input with a stochastically selected value.

Various embodiments of the second aspect may comprise at least one feature from the following bulleted list:
- the stochastical selection comprises a random or pseudo-random stochastic selection
- the dataset comprises a plurality of test images and the at least one processing core is configured to vary the stochastically selected value for each test image
- the method further comprises applying a first stochastic rectified linear unit between a first pair of convolutional layers in the artificial neural network, and applying a second stochastic rectified linear unit between a second pair of convolutional layers in the artificial neural network
- the at least one stochastic rectified linear unit is configured to produce a zero output from a negative input
- the method further comprises implementing a stochastic dropout function in the artificial neural network, the dropout feature stochastically setting half of activations within a layer to zero for each training sample
- the stochastical selection comprises that the value is randomly or pseudorandomly selected from the range (1−a, 1+a)
- the value a is 0.8
- the value a is 0.3
- the artificial neural network is a pattern recognition neural network.

According to a third aspect of the present invention, there is provided an apparatus comprising means for storing data defining, at least partly, an artificial neural network, means for training the artificial neural network by applying a test dataset to the artificial neural network with at least one stochastic rectified linear unit, the at least one stochastic rectified linear unit being configured to produce a positive output from a positive input by multiplying the input with a stochastically selected value.

According to a fourth aspect of the present invention, there is provided a non-transitory computer readable medium having stored thereon a set of computer readable instructions that, when executed by at least one processor, cause an apparatus to at least store data defining, at least partly, an artificial neural network, and train the artificial neural network by applying a test dataset to the artificial neural network with at least one stochastic rectified linear unit, the at least one stochastic rectified linear unit being configured to produce a positive output from a positive input by multiplying the input with a stochastically selected value.

According to a fifth aspect of the present invention, there is provided a computer program configured to cause a method in accordance with the second aspect to be performed.

EMBODIMENTS

Using an activation function with randomization, effects of overtraining a neural network to a specific training dataset may be alleviated. In detail, a stochastic rectified linear unit that varies a gradient of a linear function defining an output has been found to outperform classical rectified linear units. The stochastic rectified linear unit has also been found to outperform noisy rectified linear units, which use additive Gaussian noise to randomize the output.

Figure 1:
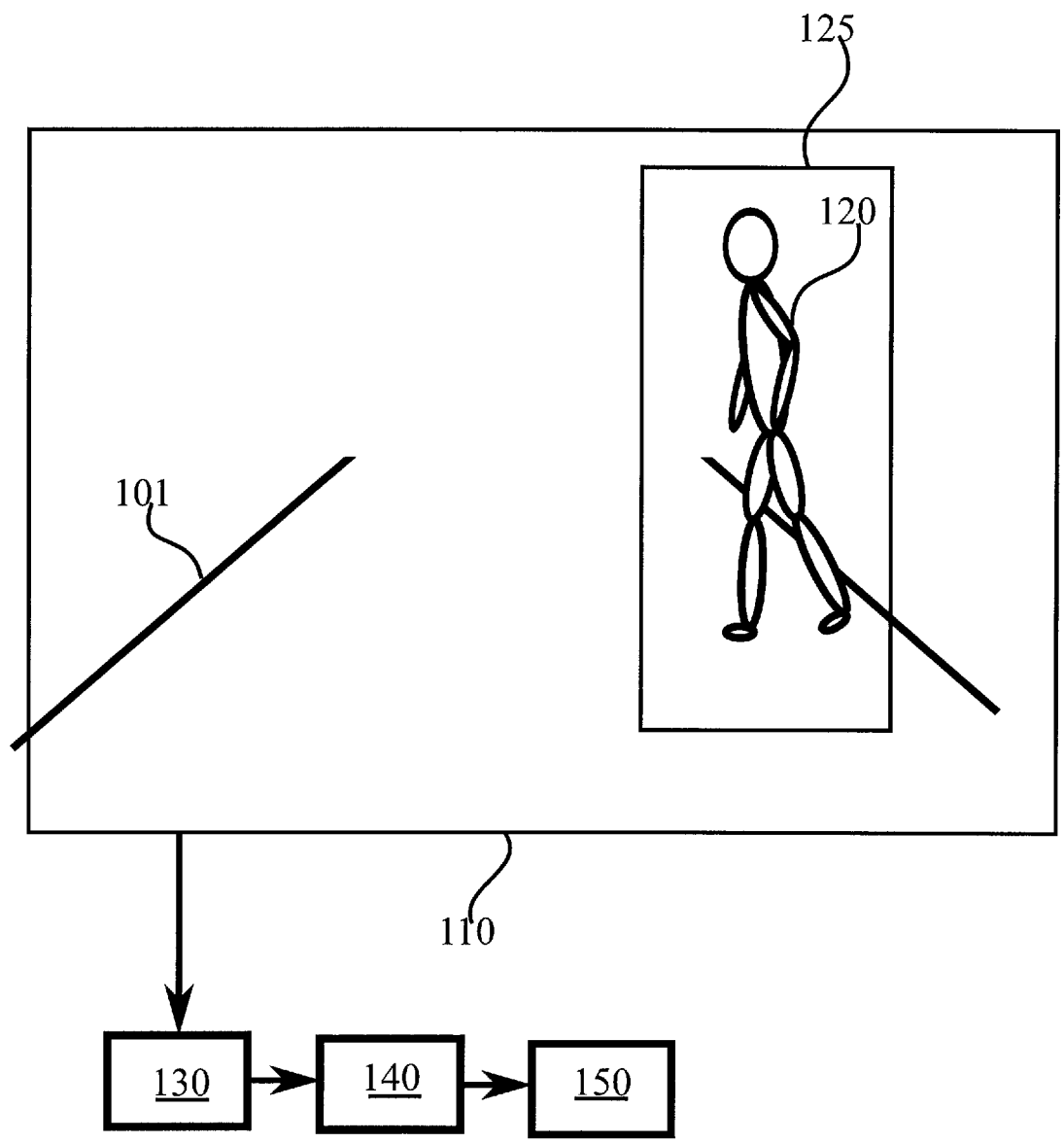
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with FIG. 1 in terms of detecting pedestrians, the invention is not restricted thereto, but as the skilled person will understand, the invention is applicable also more generally to machine recognition in visual, audio or other kind of data. For example, bicyclist recognition, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera. The camera may be configured to capture a view 110 that covers the road, at least in part. The camera may be configured to pre-process image data obtained from an image capture device, such as a charge-coupled device, CCD, comprised in the camera. Examples of pre-processing include reduction to black and white, contrast adjustment and/or brightness balancing to increase a dynamic range present in the captured image. In some embodiments, the image data is also scaled to a bit depth suitable for feeding into an image recognition algorithm, such as AdaBoost, for example. Pre-processing may include selection of an area of interest, such as area 125, for example, for feeding into the image recognition algorithm. Pre-processing may be absent or limited in nature, depending on the embodiment. The camera may be installed, for example, in a car that is configured to drive itself, or collect training data. Alternatively, the camera may be installed in a car designed to be driven by a human driver, but to provide a warning and/or automatic braking if the car appears to be about to hit a pedestrian or an animal.

An image feed from the camera may be used to generate a test dataset for use in training a neural network. Such a dataset may comprise training samples. A training sample may comprise a still image, such as a video image frame, or a short video clip, for example. Where the incoming data to be recognized is not visual data, the incoming data may comprise, for example, a vector of digital samples obtained from an analogue-to-digital converter. The analogue-to-digital converter may obtain an analogue feed from a microphone, for example, and generate the samples from the analogue feed. Overall, as discussed above, data of non-visual forms may also be the subject of machine recognition. For example, accelerometer or rotation sensor data may be used to detect whether a person is walking, running or falling. As a neural network may be trained to recognize objects in view 110, a training phase may precede a use phase, or test phase, of the neural network.

A challenge with training neural networks with test datasets is over-fitting of the neural network to the test dataset. As a neural network may comprise a large number of parameters, even millions of parameters, the network may become specialized in recognizing characteristics of the test dataset, rather than becoming specialized in performing the recognition task in a generic setting. To control the over-fitting problem, an element of randomization may be introduced between layers of the neural network.

One way to introduce an element of randomization between layers of the neural network is so-called dropout, where, during training, half of activations are randomly, or stochastically, selected and set to zero. The selecting may be re-done for each training sample, for example. Dropout may be applied to fully connected layers, for example, where it produces more of a benefit than in convolutional layers. Dropout may be seen as providing a way of approximately combining exponentially many different neural network architectures in an efficient manner. Dropout is typically applied to fully connected layers, where it may provide a benefit. Dropout does not seem to be similarly beneficial in convolutional layers.

Another way to introduce an element of randomization between layers of the neural network is stochastic pooling, wherein deterministic pooling operations, such as average and maximum pooling, are replaced with a stochastic procedure for regularizing convolutional neural networks. This procedure randomly picks the activation within each pooling region according to a multinomial distribution given by activities within the pooling region. In deep convolutional neural networks, pooling does not necessarily follow each layer. Consequently, stochastic pooling may be applied a few times. Stochastic pooling needs to compute probabilities for each region at both training time and test time, resulting in an increased computational load in a device running the neural network.

The neural network is illustrated schematically in FIG. 1 as first layer 130, rectifier 140 and second layer 150. An actual network may comprise more than two layers. Rectifier 140 may be comprised functionally in first layer 130 or second layer 150. Rectifier 150 may perform an activation function, and/or rectifier may comprise a rectified linear unit, ReLU. First and second layers may comprise convolutional layers. Alternatively, at least one, and optionally both, of first layer 130 and second layer 150 may comprise a fully connected layer.

Rectifier 140 may be configured to process an output of first layer 130, for input into second layer 150. For example, rectifier 140 may be configured to produce an output of zero from inputs that have negative values, effectively preventing negative values from being fed from first layer 130 to second layer 150. A traditional rectifier produces an output according to function f, such that $f(x)=\max(0, x)$. Values x may be comprised in real numbers, represented in a digital system by floating-point values or an integer representation, for example.

A so-called noisy rectifier, NReLU produces an output according to f, such that $f(x)=\max(0, x+N(\sigma(x)))$, where N is Gaussian noise with variance $\sigma(x)$, the Gaussian noise being employed to randomize the output of the rectifier. The variance may be obtained using all the units of one layer, for example.

A stochastic rectifier, SReLU, in accordance with the present invention, operates by obtaining an output as $f(x)=\max(0, bx)$, such that multiplier b is randomly or pseudorandomly selected from the range (1−a, 1+a). The parameter a may take the value of 0.1, 0.3, 0.5, 0.8 or 0.9, for example. Multiplier b may be randomly or pseudo-randomly re-obtained for each training sample, for example. Alternatively, multiplier b may be randomly or pseudo-randomly re-obtained several times during training of the neural network, but not separately for each training sample. For example, multiplier b may be so re-obtained every ten, or every hundred, training samples. In other words, to obtain the output, the stochastic rectifier multiplies an input with a multiplier that is randomly selected. Put in another way, a positive output is produced from a positive input such that the positive output is a linear function of the positive input, a gradient of the linear function having a variability. The variability may be random or pseudorandom, for example. In at least some embodiments of the SReLU, no noise is separately generated and additively added in to obtain the output. For negative inputs, the stochastic rectifier may be arranged to return a zero output.

The stochastic rectifier, SReLU, may be used at training time, while at test time, also referred to as simply during use, a traditional rectifier may be used, wherein in the traditional rectifier, the output f(x) produced by input x is $f(x)=\max(0, x)$.

The stochastic rectifier, as defined above, yields improved recognition results with compared to both the traditional rectifier and the noisy rectifier. In a study conducted by the inventor, the following results were obtained, dropout being optionally used in a fully connected layer:

| Dataset | Approach | Test error without dropout | Test error with dropout |
|---|---|---|---|
| CIFAR-10 | CNN-ReLU | 10.06% | 6.68% |
| | CNN-NReLU | 7.52% | 6.53% |
| | CNN-SReLU | 6.45% | 6.04% |

Introducing randomization into the neural network improves performance, since two similar training samples will produce similar, but not the same, responses with randomization. Thus the test dataset effectively becomes larger, leading to improved performance. Over-fitting is also prevented, since the neural network cannot fit exactly to the training samples, the training samples producing the randomized, and no longer identical, or fully deterministic, output.

Figure 2:
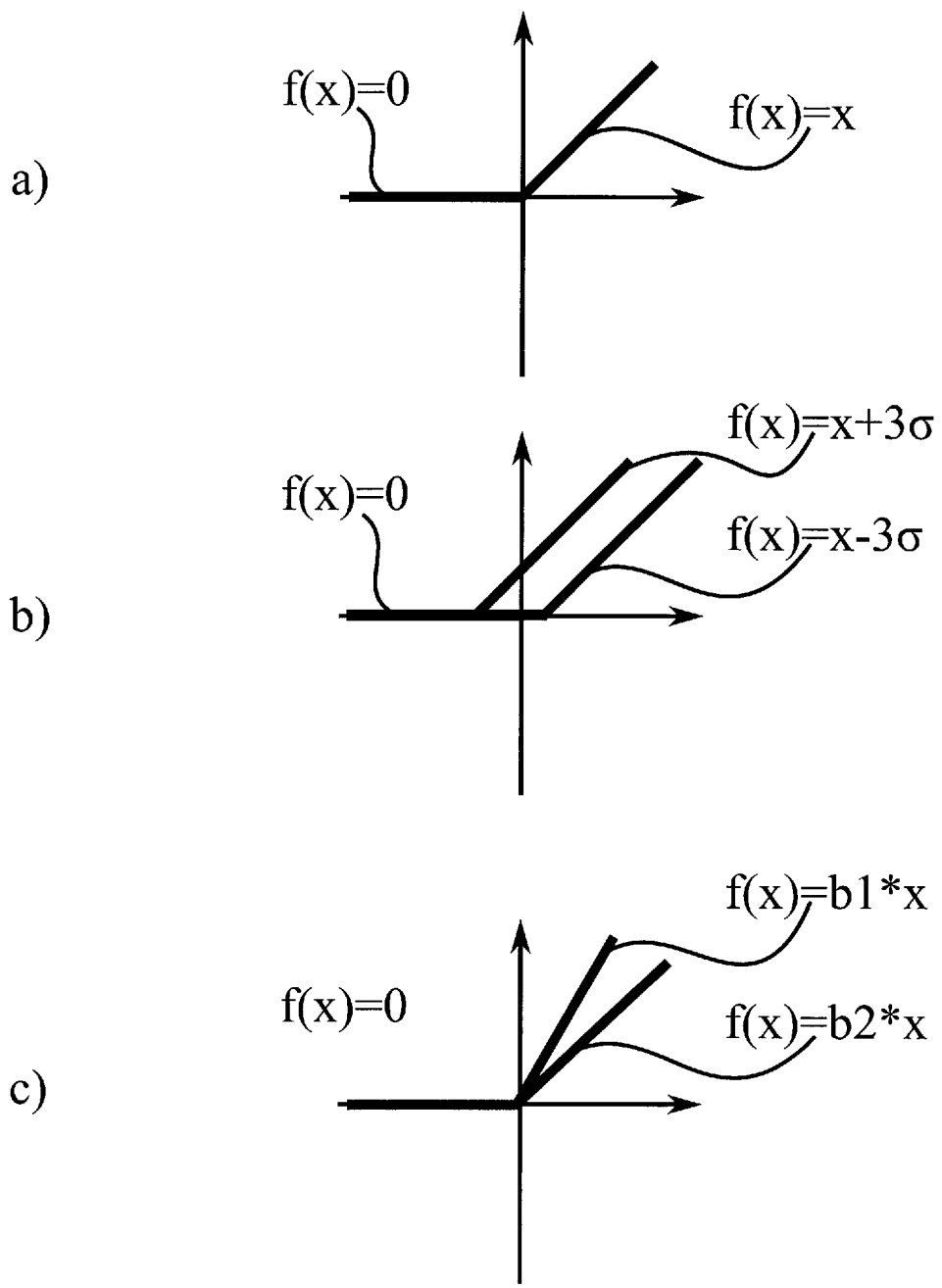
FIG. 2 illustrates rectifiers.

FIG. 2 illustrates rectifiers. In the upper part of the figure, denoted as a), is illustrated a traditional rectifier, ReLU, wherein $f(x)=x$ for positive x and $f(x)=0$ for negative or zero x. The response for positive x is linear with a gradient of unity.

In the middle part of the figure, denoted by b), is a noisy rectifier, NReLU, wherein $f(x)=\max(0, x+N)$, N being Gaussian noise. The output of the rectifier for positive x lies between the two lines, denoted as $f(x)=x+3\sigma$ and $f(x)=x-3\sigma$. In other words, in NReLU, a randomly selected value is added to the output. Outputs of the NReLU will predominantly lie between the two lines, for positive inputs. For some slightly negative inputs, the NReLU may return a positive output in case the addition of Gaussian noise increases causes the output to exceed zero. Thus the upper, $x+3\sigma$, line intersects the y-axis above the origin.

In the lower part of the figure, denoted by c), is a stochastic rectifier, SReLU. The output of the rectifier for positive x lies between the two lines, denoted as b1*x and b2*x. For negative x the output is zero. In other words, the output for positive input is obtained by multiplying the input with a randomly selected value. In terms of FIG. 1, b1=1+a and b2=1−a. Expressed another way, a positive output is produced from a positive input such that the positive output is a linear function of the positive input, a gradient of the linear function having a variability. The SReLU may be configured, as illustrated, to return a zero output from a negative or zero input.

The benefit of SReLU over NReLU may be understood with reference to the figure, since the range of variation in NReLU is constant, being so also for small input values. in SReLU, however, the range of variation decreases as the input approaches zero from the positive direction, which maintains signals in small-amplitude inputs better than NReLU. Furthermore, compared to NReLU, SReLU is computationally more efficient, since SReLU directly multiplies each activation unit with the multiplier selected from the range. NReLU, on the other hand, calculates an input variance from each layer, and then adds a bias selected from a Gaussian distribution to each activation unit. SReLU may, in general, be employed in an artificial convolutional neural network.

Figure 3:
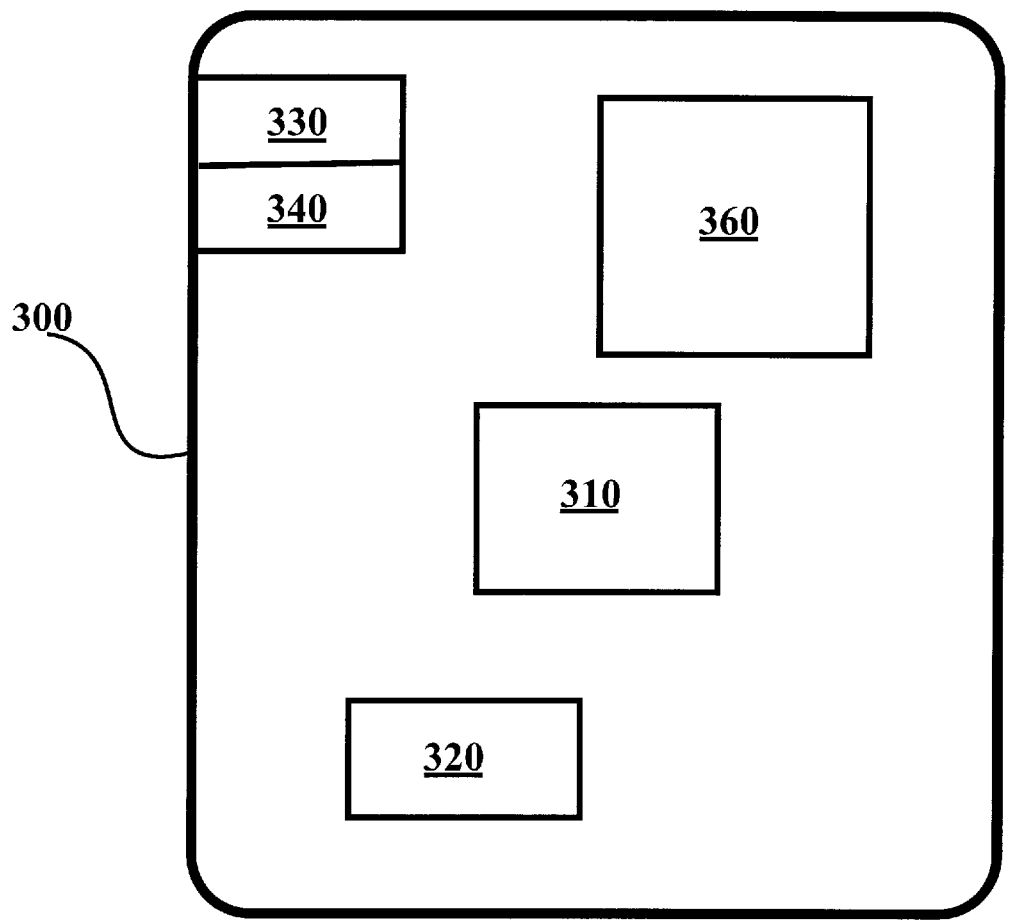
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing device such a server, node or cloud computing device. Device 300 may be configured to run a neural network, such as is described herein. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core by ARM Holdings or a Steamroller processing core produced by Advanced Micro Devices Corporation. Processor 310 may comprise at least one Qualcomm Snapdragon and/or Intel Core processor, for example. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Computer instructions in memory 320 may comprise a plurality of applications or processes. For example, machine learning algorithms, such as an AdaBoost algorithm with its classifiers, may run in one application or process, a camera functionality may run in another application or process, and an output of a machine learning procedure may be provided to a further application or process, which may comprise an automobile driving process, for example, to cause a braking action to be triggered responsive to recognition of a pedestrian in a camera view.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with wireless local area network, WLAN, Ethernet, universal serial bus, USB, and/or worldwide interoperability for microwave access, WiMAX, standards, for example. Alternatively or additionally, a proprietary communication framework may be utilized.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure machine learning parameters and/or to switch device 300 on and/or off.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340, and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
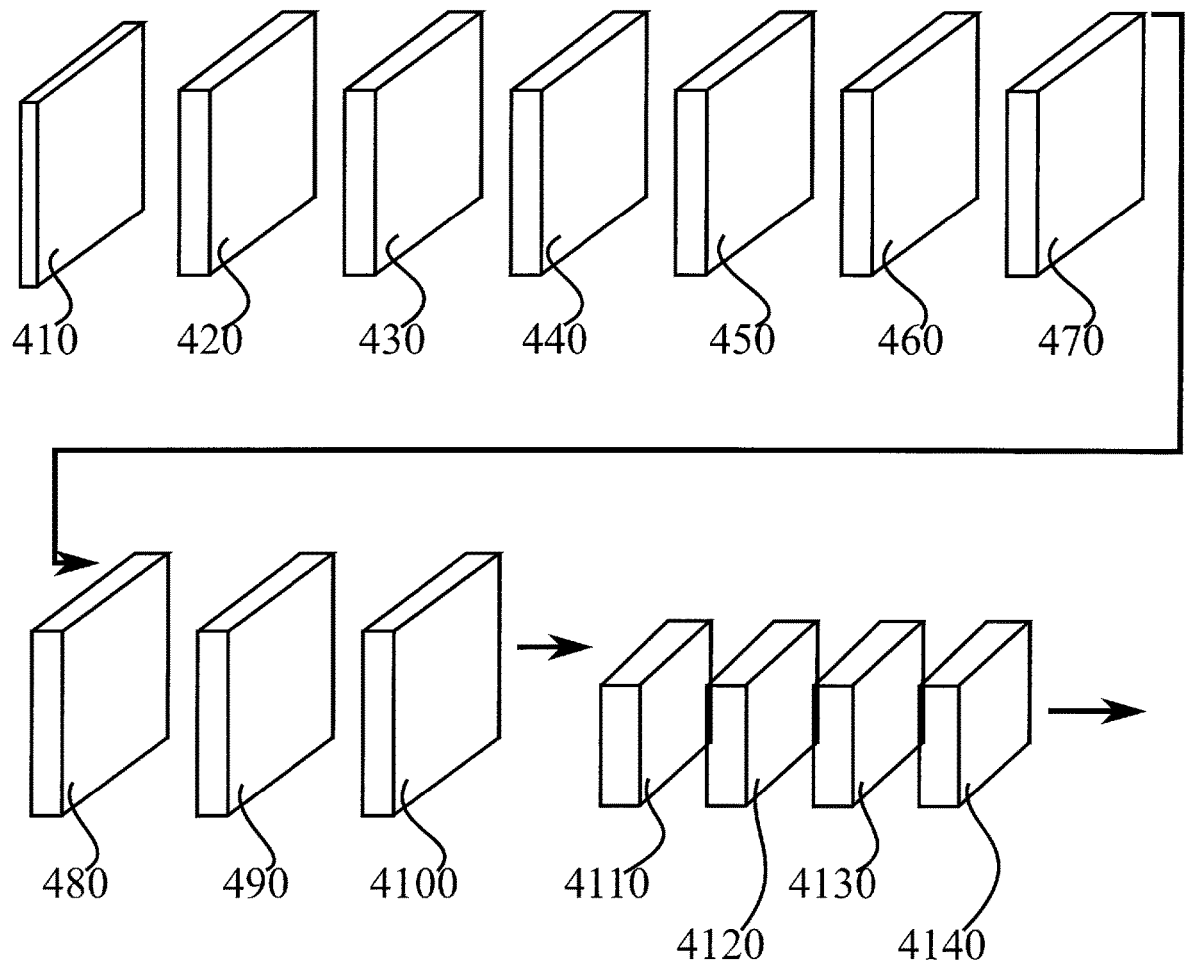
FIG. 4 illustrates a neural network in accordance with at least some embodiments of the present invention.

FIG. 4 illustrates a neural network in accordance with at least some embodiments of the present invention. The network comprises an input layer 410, which may have dimensions of 32×32, for example. Layers 420, 430 and 440 may have dimensions 32×32, with depth 128. Layer 420 may run 3×3 convolutional kernels with SReLU output, layer 420 may likewise run 3×3 convolutional kernels with SReLU output, and layer 440 may run 1×1 convolutional kernels with SReLU output. Each of layers 420, 430 and 440 outputs 128 feature channels.

Layers 450 and 460 may each have dimensions 32×32 with depth 192, and run 3×3 convolutional kernels with SReLU output. Layer 470 may run 1×1 convolutional kernels, apply SReLU to output and implement a dropout, as described herein above.

Processing advances from layer 470 to layer 480 via a Max pooling procedure. Layers 480 and 490 may have dimensions 16×16, with depth 256, and they may run 3×3 convolutional kernels with SReLU output. Layer 4100 may have 16×16 dimensions with 256 depth, with SReLU output and dropout. Processing advances from layer 4100 to layer 4110 via a Max pooling procedure. Layers 4110 and 4120 may have dimensions 8×8 with depth 512, and they may run 3×3 convolutional kernels with SReLU output. Layers 4130 and 4140 may have dimensions 8×8 with depth 512 and 10, respectively, running 1×1 convolutional kernels with SReLU and ReLU output, respectively. From layer 4140, which runs ten feature channels, processing may advance to a decision phase via an Average pooling procedure. Activations in each channel are averaged to generate one score for each category. The decision phase may comprise 10-class softmax classifier, for example.

To generate a neural network with SReLU on accordance with the example in FIG. 4, initially all convolutional layers may be provided with ReLU output, after which all except the last one may be replaced with SReLU output. The neural network may, in general, comprise an artificial convolutional neural network, for example.

Figure 5:
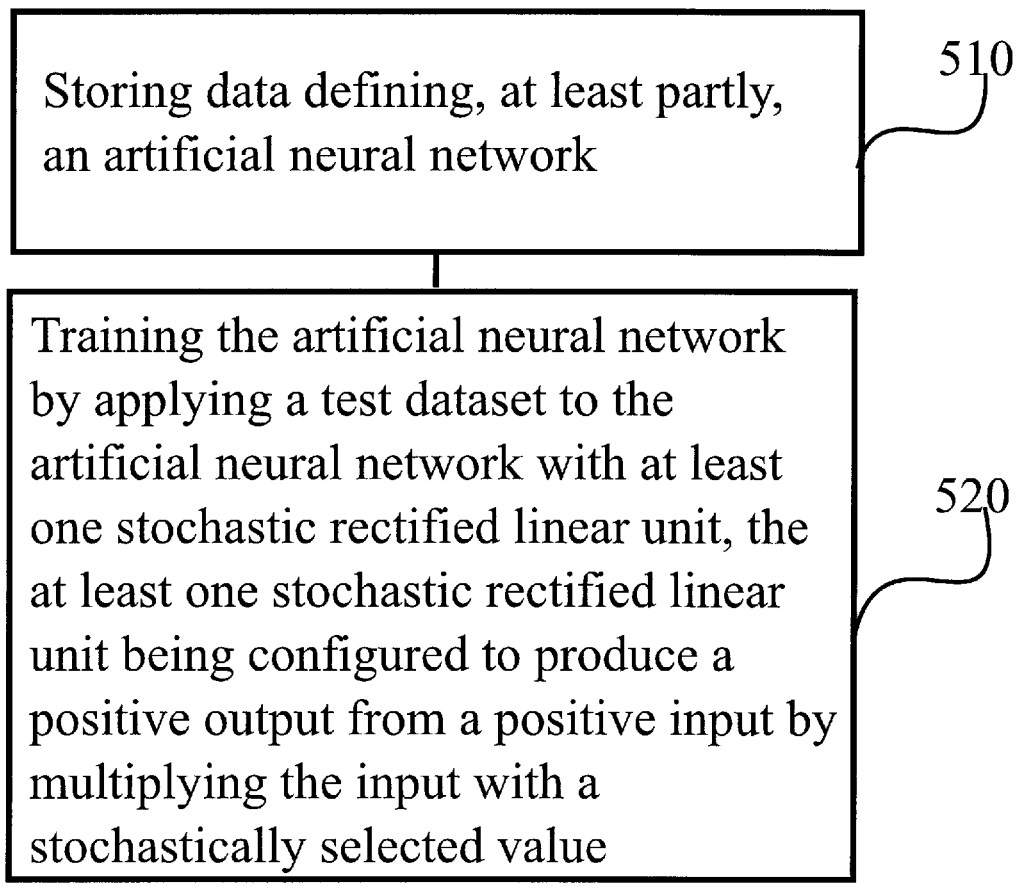
FIG. 5 is a flow graph of a method in accordance with at least some embodiments of the present invention.

FIG. 5 is a flow graph of a method in accordance with at least some embodiments of the present invention. The phases of the illustrated method may be performed in a device arranged to run the neural network, for example, by a control device of such a device.

Phase 510 comprises storing data defining, at least partly, an artificial neural network. Phase 510 comprises training the artificial neural network by applying a test dataset to the artificial neural network with at least one stochastic rectified linear unit, the at least one stochastic rectified linear unit being configured to produce a positive output from a positive input by multiplying the input with a stochastically selected value.

In use, after training, the stochastic rectified linear unit may be replaced in the artificial neural network with a rectified linear unit which returns an output f from input x according to f(x)=max(0, x).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optimizing machine recognition, to, for example, reduce traffic accidents in self-driving vehicles.

ACRONYMS

CNN convolutional neural network
NReLU noisy ReLU
ReLU rectified linear unit
SReLU stochastic ReLU

REFERENCE SIGNS LIST

| | |
|---|---|
| 110 | View |
| 101 | Road |
| 125 | Area of interest |
| 120 | Pedestrian |
| 130 | First layer |
| 140 | Rectifier |
| 150 | Second layer |
| 300-360 | Structure of device of FIG. 3 |
| 410-4140 | Layers of the neural network illustrated in FIG. 4 |
| 510-520 | Phases of the method of FIG. 5 |

What is claimed is:

1. An apparatus comprising:
memory configured to store data defining, at least partly, an artificial neural network, and
at least one processing core configured to train the artificial neural network by applying a test dataset to the artificial neural network with at least one stochastic rectified linear unit, the at least one stochastic rectified linear unit being configured to produce a positive output from a positive input by multiplying the input with a stochastically selected value, wherein the stochastically selected value is varied during training.

2. The apparatus according to claim 1, wherein the stochastically selected value is varied a plurality of times during the training based on a random or pseudorandom stochastic selection.

3. The apparatus according to claim 1, wherein the dataset comprises a plurality of test images and the at least one processing core is configured to vary the stochastically selected value for each test image during the training.

4. The apparatus according to claim 1, wherein the at least one processing core is configured to apply a first stochastic rectified linear unit between a first pair of convolutional layers in the artificial neural network, and a second stochastic rectified linear unit between a second pair of convolutional layers in the artificial neural network.

5. The apparatus according to claim 1, wherein the at least one stochastic rectified linear unit is configured to produce a zero output from a negative input.

6. The apparatus according to claim 1, wherein the at least one processing core is configured to implement a stochastic dropout function in the artificial neural network, the dropout feature stochastically setting half of activations within a layer to zero for each training sample.

7. The apparatus according to claim 1, wherein the stochastical selection comprises that the value is randomly or pseudorandomly selected from the range (1−a, 1+a), wherein a is a number.

8. The apparatus according to claim 1, wherein in the artificial neural network is a pattern recognition neural network.

9. The apparatus according to claim 1, wherein the dataset comprises a plurality of test images and the at least one processing core is configured to vary the stochastically selected value for different test images during the training.

10. A method comprising:
storing data defining, at least partly, an artificial neural network, and
training the artificial neural network by applying a test dataset to the artificial neural network with at least one stochastic rectified linear unit, the at least one stochastic rectified linear unit being configured to produce a positive output from a positive input by multiplying the input with a stochastically selected value, wherein the stochastically selected value is varied during training.

11. The method according to claim 10, wherein the stochastically selected value is varied a plurality of times during the training based on a random or pseudorandom stochastic selection.

12. The method according to claim 10, wherein the dataset comprises a plurality of test images and the at least one processing core is configured to vary the stochastically selected value for each test image during the training.

13. The method according to claim 10, further comprising applying a first stochastic rectified linear unit between a first pair of convolutional layers in the artificial neural network, and applying a second stochastic rectified linear unit between a second pair of convolutional layers in the artificial neural network.

14. The method according to claim 10, wherein the at least one stochastic rectified linear unit is configured to produce a zero output from a negative input.

15. The method according to claim 10, further comprising implementing a stochastic dropout function in the artificial neural network, the dropout feature stochastically setting half of activations within a layer to zero for each training sample.

16. The method according to claim 10, wherein the stochastical selection comprises that the value is randomly or pseudorandomly selected from the range (1−a, 1+a), wherein a is a number.

17. The method according to claim 10, wherein in the artificial neural network is a pattern recognition neural network.

18. A non-transitory computer readable storage medium having stored thereon a set of computer readable instructions that, when executed by at least one processor, cause an apparatus to at least: store data defining, at least partly, an artificial neural network; train the artificial neural network by applying a test dataset to the artificial neural network with at least one stochastic rectified linear unit, the at least one stochastic rectified linear unit being configured to produce a positive output from a positive input by multiplying the input with a stochastically selected value, wherein the stochastically selected value is varied during training.

19. The non-transitory computer readable storage medium according to claim 18, wherein the stochastically selected value is varied a plurality of times during the training based on a random or pseudorandom stochastic selection.

20. The non-transitory computer readable storage medium according to claim 18, wherein the dataset comprises a plurality of test images and the at least one processing core is configured to vary the stochastically selected value for each test image during the training.

* * * * *